United States Patent [19]

Keefe

[11] Patent Number: 5,138,184

[45] Date of Patent: Aug. 11, 1992

[54] SOLID STATE STATIC POWER TRANSFER MECHANISM

[75] Inventor: John Keefe, Chanhassen, Minn.

[73] Assignee: PowerTrol, Inc., Minneapolis, Minn.

[21] Appl. No.: 467,946

[22] Filed: Jan. 22, 1990

[51] Int. Cl.⁵ .................................................. H02J 9/00
[52] U.S. Cl. ..................................... 307/64; 307/127; 307/130
[58] Field of Search ..................... 307/64, 85, 87, 125, 307/127, 130

[56] References Cited

U.S. PATENT DOCUMENTS

| | | | |
|---|---|---|---|
| 3,932,764 | 1/1976 | Corey | 307/87 |
| 4,484,084 | 11/1984 | Cheffer | 307/64 |
| 4,761,563 | 8/1988 | Ross et al. | 307/87 |

Primary Examiner—A. D. Pellinen
Assistant Examiner—Jeffrey A. Gaffin
Attorney, Agent, or Firm—James R. Cwayna

[57] ABSTRACT

A solid state, static power supply control mechanism for coordinated transfer of a load from a preferred source of AC power to an alternate source of AC power should the level of power transmitted from the preferred source fall below a set, adjustable level and thereafter, upon re-establishment of the proper level of operating power of the preferred source, re-transfer of the load from the alternate source to the preferred source. A unique method of current interlock prevents the alternate power source from connecting to the load until the current from the preferred source is absolutely interrupted, with the same criteria required for re-transfer from the alternate to the preferred source of power. This mechanism and associated switching technique insures supply of power to the load regardless of the preferred power source failure mode and regardless of the phase relation of the preferred and alternate sources of power.

13 Claims, 5 Drawing Sheets

SOLID STATE STATIC POWER TRANSFER MECHANISM

FIELD OF THE INVENTION

This invention relates generally to mechanisms for coordinated transfer of a load from one power source to another power source upon any failure of the first power source and re-transfer of the power sources when the first or preferred power source returns or is returned to a stabilized, proper mode of operation.

SHORT SUMMARY OF THE INVENTION

A solid state, static, power transfer mechanism which employs inverse, parallel, silicon controlled rectifiers as the primary elements to switch a load from a first, preferred, AC source to a second, alternate, AC source should the primary or preferred source fail in any mode that will cause improper operation of the connected load. The transfer is accomplished under conditions of time, current, voltage and phase relation requirements that ensure continued and proper operation of the connected load.

The invention also includes the aspect of automatically reversing the transfer from the alternate to the preferred AC source upon return of the preferred source to proper operational mode, with no fault of the alternate source being required to trigger such action. A primary aspect of the invention is that the mechanism includes a unique method of current interlock which prevents the load transfer to the alternate source until the preferred source is completely interrupted and, similarly, vice-versa. This interlock prevents powering of the load from both sources at any one period of time, which, in turn, prevents an interphase short should the two sources be out of phase.

In operation, when the output level of a preferred power source exceeds a peak voltage detector setting, the output of this detector actuates a time delay. At the end of the time delay period one input to a first gate is enabled and one input to a second gate is disabled. With the second gate disabled it has no "switch on" output so a solid state switch to the alternate power source is off and its "switch off" output is high. This signal enables the first gate, whose "switch on" output turns on the solid state switch of the preferred source. The "switch off" output of the preferred source solid state switch then goes low, which holds the second gate disabled.

If the preferred AC power falls below a predetermined peak voltage detector setting, the peak voltage detector's output goes low which disables the first gate. This results in a high output at the second gate. Disabling of the first gate removes the "switch on" input from the solid state switch of the preferred source. When the latter turns off, its "switch off" output goes high which completes the enabling of the second gate. When the second gate output goes high, which is the "switch on" input to the solid state switch of the alternate source, the latter turns on. Its "switch off" output then goes low, holding the first gate disabled and holding the solid state switch of the preferred source off. At this time the load is operating from the alternate power source.

When the preferred power source is restored and again exceeds the peak voltage detector setting, the output of the peak voltage detector must stay at such proper power level for at least the time delay setting. Once this time delay has expired, one input to the first gate is enabled and the second gate is disabled. This removes the "switch on" input from the solid state switch alternate power source. When the latter turns off, its "switch off" output goes high, thus completing the enabling of the first gate. The latter's "switch on" output then turns on the solid state switch of the preferred source and the load voltage is then supplied by the preferred source.

In this manner, coordinated, rapid switching takes place between the preferred source and the alternate source at a speed sufficiently great that the resulting brief time period without voltage has no effect on the equipment being operated. Further, the coordination of switching action prevents damage to equipment by preventing arcing and voltage transients that could occur if the load were connected to two out-of-phase power sources simultaneously or if contact bounce were present.

BACKGROUND AND OBJECTS OF THE INVENTION

In applicant's investigation of the particular art to which the invention is related, a generic category of power transfer switches was undertaken. Static transfer switches are so named because there are no moving parts, thus distinguishing them from electro-mechanical transfer switches. The category of solid state power transfer switches simply did not exist until recent years.

Electro-mechanical switches were discovered in the prior art that were built in a manner as to be totally irrelevant to the concept of this invention. Of all of the prior art considered, only two Patents were found which applied in any way to what may be termed a solid state static power transfer mechanism. These included the Corey U.S. Pat. No. 3,932,764 and Cheffer U.S. Pat. No. 4,484,084.

The Patent to Corey covers the method of sensing current in a preferred AC source by using its amplitude and phase to feed comparator circuits in a solid state uninterruptable power source (UPS) system, to so control the output voltage phase and amplitude of the UPS system such that the load may be transferred from the utility, preferred, AC to the UPS AC without a resulting voltage transient. A main aspect of the mechanism involved and disclosed in this application is to provide transfer between any two AC sources of any phase relationship and does not require a UPS as one of the sources. The Corey Patent on the other hand does require a UPS and its attendant phase synchronization as one source.

The patent to Cheffer covers a method of transferring a load from an AC line to the output of a DC to AC inverter using solid state devices where the output of the DC to AC inverter is held in phase synchronization with the AC line. Basically this patent does not relate to the mechanism herein disclosed because this disclosed mechanism is designed to transfer between any two AC sources of any phase relationship and therefore is asynchronous.

It is well known that, in the use of high speed solid state circuitry for control and data handling operations and applications, many problems have been created. One such problem is the intolerance of equipment for aberrations in the power source, the most common of which is "power failure". Usually power failure is visualized as the absence of the power source, but in terms of equipment operation a realistic power failure is constituted by a drop in voltage sufficient to cause malfunction or damage to the equipment. Therefore, either lower voltage or no voltage are "power failures".

Early switches developed to resolve these problems included rotating equipment and mechanical transfer switches to switch the equipment from a preferred to an alternate source if the preferred source should fail, and to transfer back when the preferred source returned to an acceptable level. Many transfer switches were, and are today, electromechanical and these typically consist of a voltage sensing relay to control the preferred contactor and the alternate contactor. A voltage which drops below a predetermined value de-energizes a relay thus disconnecting the preferred contactor. As the two sources can be out of phase, a condition that would produce an interphase short circuit if the sources were connected, means were provided to insure that the preferred source was completely disconnected before the alternate source was connected. This required a mechanical interlock. For several reasons this approach has not been useable with high speed solid state circuitry which is used for control of critical processes. For example, on an instantaneous voltage failure the load is without voltage for a period of time equal to the sum of time required for voltage sensing relay operation, preferred contactor operation and alternate contactor operation. This is much too long for solid state equipment. In addition, interruption and reconnection can take place at any instant of time on the sine wave of a source voltage. This may produce arcing, intense radiated and conducted noise which may cause the solid state equipment to malfunction and which further results in transient voltage spikes which may damage the equipment. Physical contacts, for example, will bounce when they are rapidly opened or closed.

Uninterruptable power supply, UPS, systems have been developed which solve certain problems of providing power continuity to a load should the preferred source fail, but for maximum reliability an alternate source of power must also be present and accessible by the system.

Since UPS systems require alternative power from outside sources, it follows that the UPS system is in many cases an expensive redundancy. This fact suggests the use of an enhanced solid state power transfer mechanism to switch the load directly from a preferred to an alternate source without employing a UPS system. Recent developments in SCR and intelligent sensors make this goal achievable. Such an enhanced transfer system must meet certain requirements, which include means for sensing preferred source power failure to initiate the transfer, turn-off of a preferred source and turn-on of the alternate source without any adverse effects from the cause of the failure and independent of the preferred/alternate phase relationship. Critical to this situation is the restoration of voltage quickly enough to prevent any load malfunctions, and this must all be done without arcing or voltage transients and with a minimization of current surges.

It is therefore an object of the applicant's invention to provide a solid state power transfer mechanism which smoothly and effectively transfers power from a first preferred source to an alternate source rapidly and in a manner to prevent any load malfunctions.

It is a further object of the applicant's invention to provide a solid state power transfer mechanism wherein control of switching is maintained to prevent supply of power from both sources at any particular instant.

It is still a further object of the applicant's invention to provide a solid state power transfer device which insures that once the power transfer from a preferred to an alternate source has been made and the preferred source then returns to a proper operative condition, that coordinated re-transfer will automatically occur without any load malfunctions.

It is yet a further object of the applicant's invention to provide a solid state power transfer device which gives proper indication to the user thereof of the operating status of both the preferred and alternate sources and the availability of means for switching from one source to another.

It is still a further object of the applicant's invention to provide a solid state power transfer mechanism wherein a failure of the preferred source will initiate transfer to the alternate source only after the transfer mechanism insures that the preferred source current is discontinued, any difference in phase relation between the two sources thus being unable to cause an interphase short circuit; and which, upon reversal of this transfer, back to the preferred, now operative source, the same considerations are given and the preferred source is not reactivated until the alternate source ceases to deliver current to the load.

Still, a further object of applicant's invention is to provide an optional means of continuously monitoring the operational integrity of the utilized solid state switches for junction shorting and providing indication of such a shorted condition.

DESCRIPTION OF A PREFERRED FORM OF THE INVENTION

Figure 1:
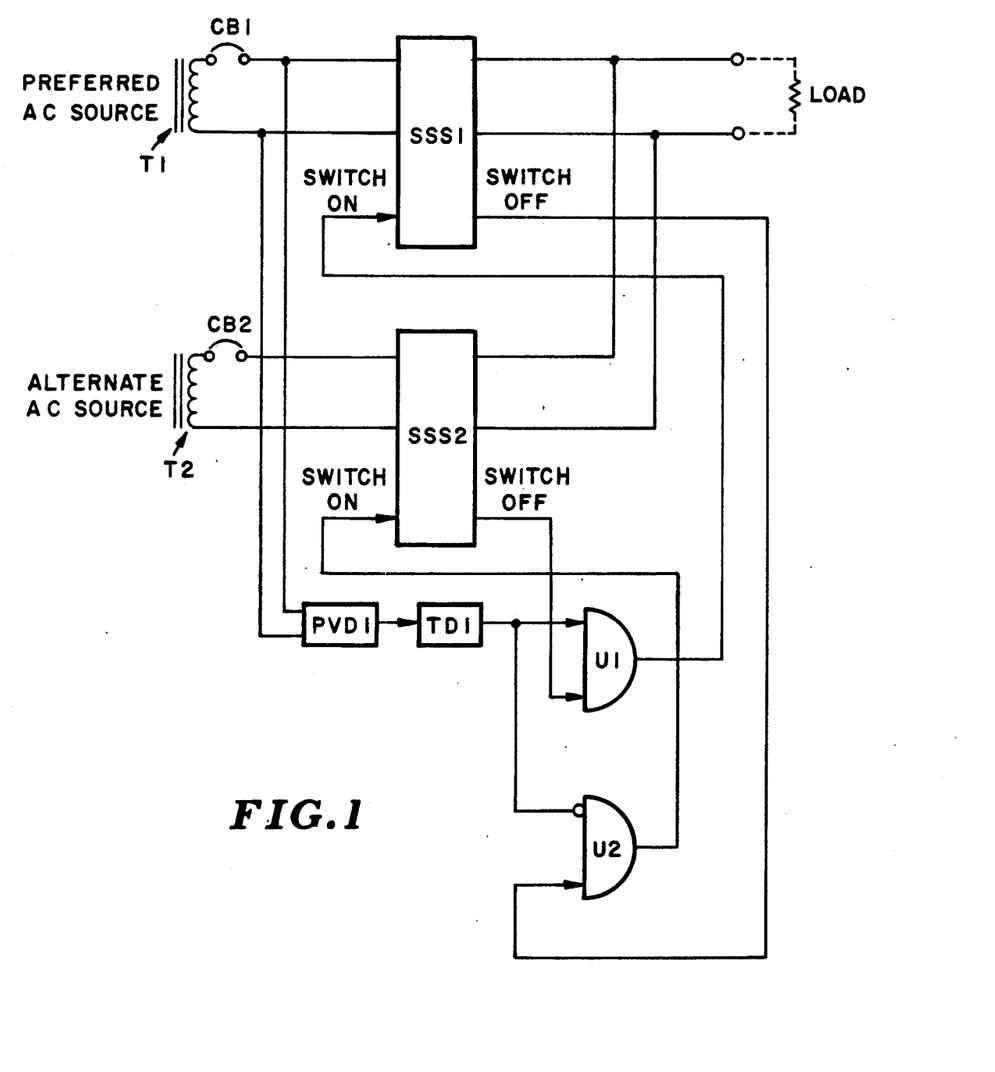
FIG. 1 is a basic block diagram of the circuitry embodying the concepts of the applicant's invention.

In accordance with the accompanying drawings, FIG. 1 is a block diagram which basically includes the concepts of the switching mechanism and is substantially described in the short summary of the invention. To restate this situation, a preferred AC source and an alternate AC source are provided with transformers T1, T2 and circuit breakers CB1, CB2. Both the preferred and alternate AC sources include a solid state switching device represented by block diagrams SSS1, SSS2. An interconnection from the preferred source is directed to a peak voltage detector PVD1 with an accompanying time delay TD1. A pair of gates U1, U2 are provided which control switching from preferred to alternate source in response to conditions of the preferred source and vice-versa on restoration of the preferred AC source to an operational mode as insured by an operational monitoring time factor.

When the preferred AC exceeds the peak voltage detector PVD1 adjustable setting, the output thereof goes high to actuate time delay TD1. At the end of the time delay period, one input to gate U1 is enabled and one input to gate U2 is disabled. As gate U2 is disabled it has no switch-on output so the solid state switch SSS2 is off and its switch off output is high. This enables gate U1, whose switch-on output turns on SSS1 to allow power transfer from the preferred source to the load and, simultaneously, its switch-off output goes low to hold gate U2 in disabled condition.

If the preferred AC source falls below the peak voltage detector setting the output thereof goes low thus disabling gate U1. This also results in a high input to gate U2. Disabling gate U1 removes the switch-on input from solid state switch SSS1. When SSS1 turns off, its switch-off output goes high which completes the enabling of gate U2. Upon this enabling, the output of gate U2 goes high which is the switch-on to SSS2 thus turning on the same. Its switch-off output then goes low which holds gate U1 disabled and holds SSS1 in the off condition. At this point the load is being operated from the alternate power source.

When the preferred source, which has been constantly monitored, again exceeds the PVD1 setting and if the output thereof stays high for at least the time delay period of TD1, which is of adjustable duration, then one input to gate U1 is enabled and gate U2 is disabled. This removes the switch-on input from SSS2. When SSS2 turns off its switch-off output goes high which completes the enabling of gate U1. The switch-on output of gate U1 now turns on SSS1 and the load is again supplied from the preferred source.

Figure 4:
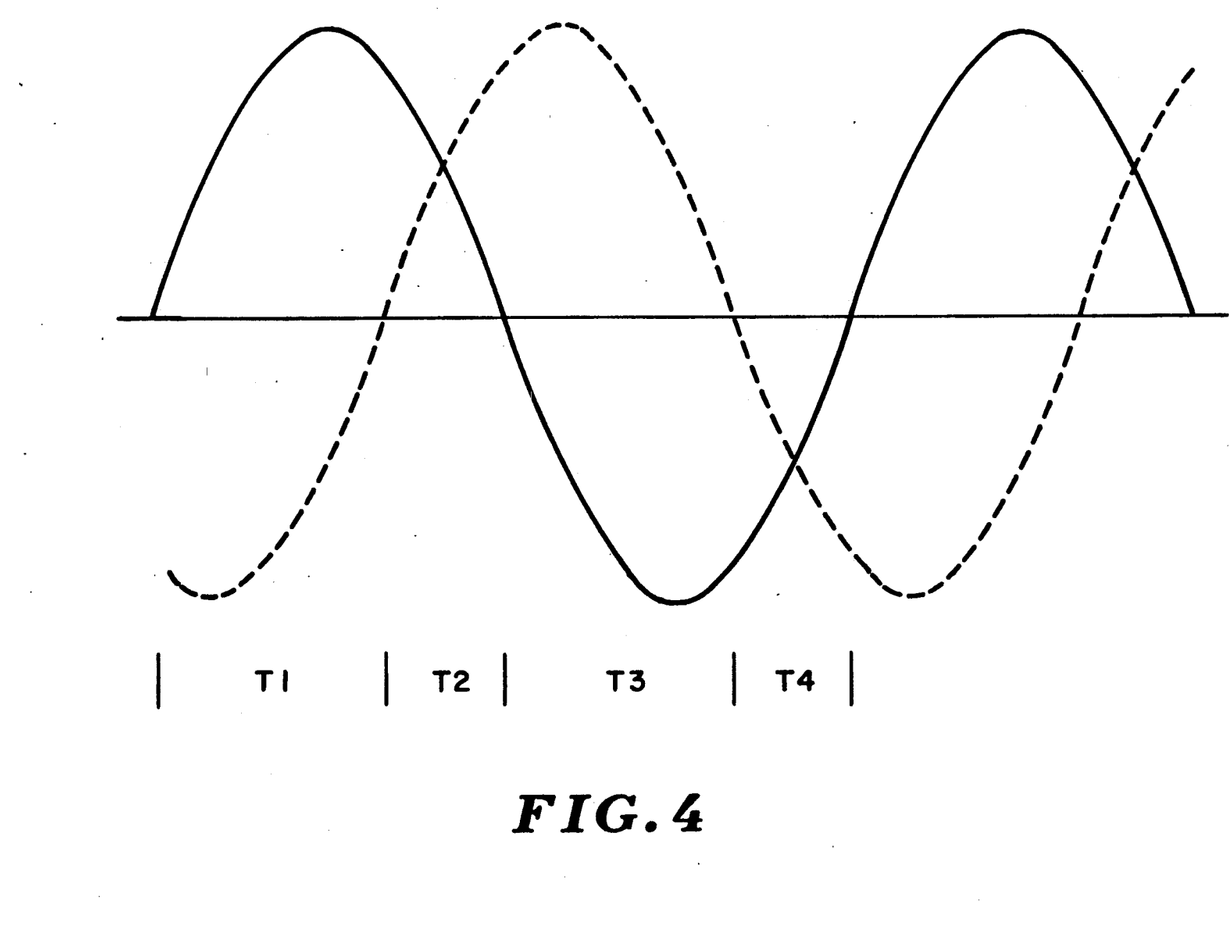
FIG. 4 is an illustrative schematic of the timing and power transfer situations of the unit; and, FIG. 5 is an illustrative schematic of the optional junction shorting monitor and associated alarm.

For further consideration of the applicant's unit a discussion of FIG. 4 follows. In FIG. 4 a preferred and an alternate source of AC power is illustrated as being out of phase by 120 degrees. This is a typical displacement in any three phase system. Time intervals are illustrated as T1, T2, T3 and T4 (not to be confused with the transformers T1 and T2 of FIG. 1). These time intervals occur between voltage zeros. As power failures are random, it is possible that control input to the preferred switch SSS1 is switched off and input to the alternate switch SSS2 is switched on during the time period T3. This would occur if the preferred source fell below its predetermined set point but was still present to some degree. As the preferred switch had already gone through zero the junctions thereof would remain on until the end of T4 and in the meantime the alternate source would go through a zero and turn on at the end of T3, assuming switches of "zero voltage turn-on" construction. Therefore both sources would be connected during the period T4. Since the voltages are out of phase, a potential damaging current would circulate between the phases as determined by the voltage difference and the impedance of the sources. A similar problem will occur during period T2. Conversely, if switching of the control inputs takes place during either the period of T2 or T4, the preferred source turns off before the alternate turns on and no overlap occurs. The probability of overlap occurring on such a random power failure is equal to the expression T3/(T3+T4) which equals 66.7 percent. In other words, this problem would occur on two out of three transfers. The probability will obviously change with phase displacement but will always exist except for the case when the two sources are in phase. This problem is eliminated by the applicant's invention with an electrical interlock provided by current detection, which results in providing that a solid-state switch from which the control input has been removed is in fact off. In other words, no current is being transferred from the preferred source when the off switches, connecting the load to the alternate AC source, turn on. The electrical interlock provided by zero current detection accomplishes this and is a unique feature of the applicant's switching technique.

It should be obvious that the applicant's invention is applicable to single or three phase circuits. In the latter application it is merely a matter of using one of applicant's transfer mechanisms in each leg of the 3-phase source. This aspect of the applicant's invention should be retained in the entire reading of this disclosure.

Figure 2:
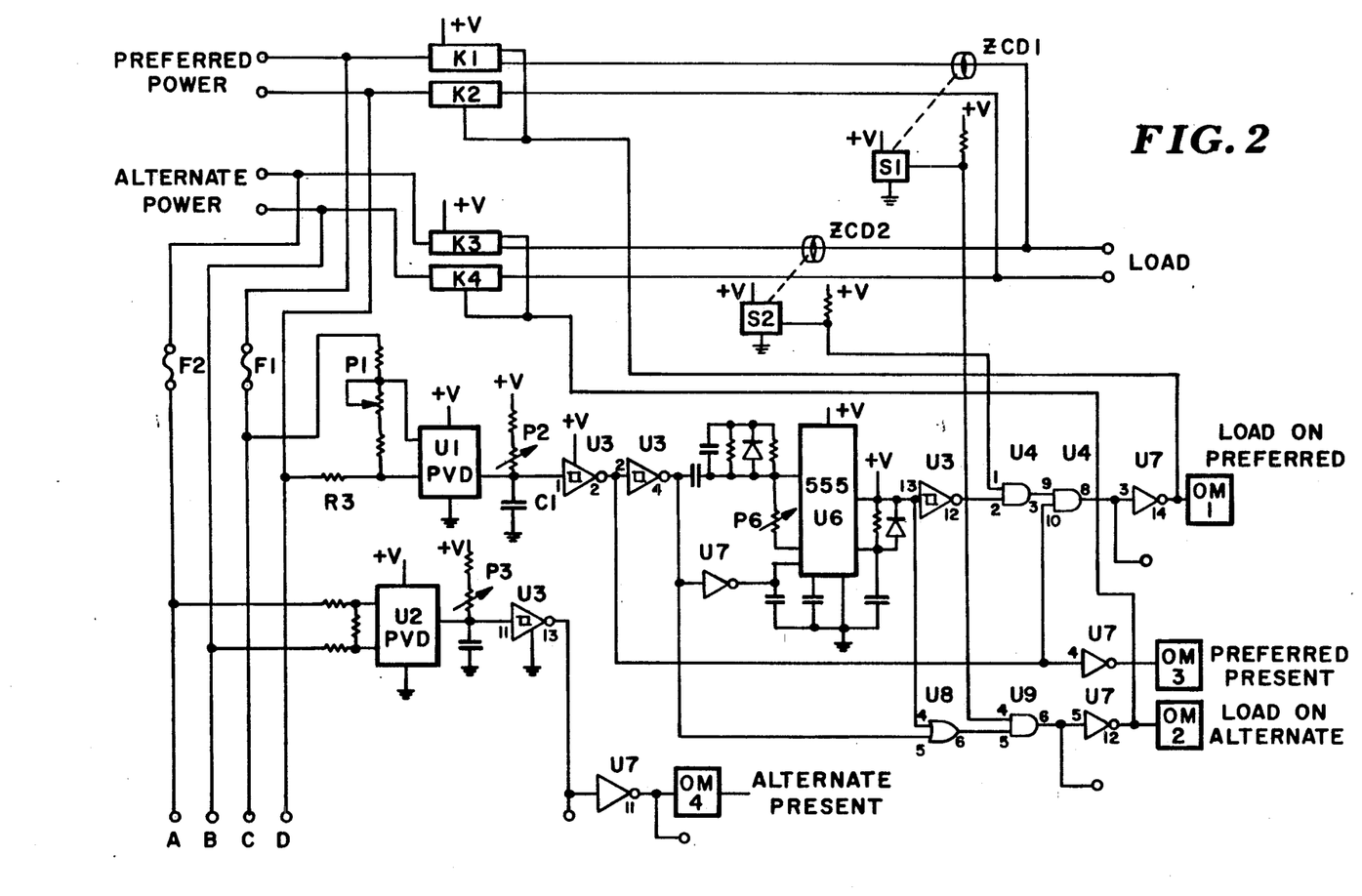
FIG. 2 is a first portion of a schematic diagram particularly illustrating the various components of a first section of the switching device.
Figure 3:
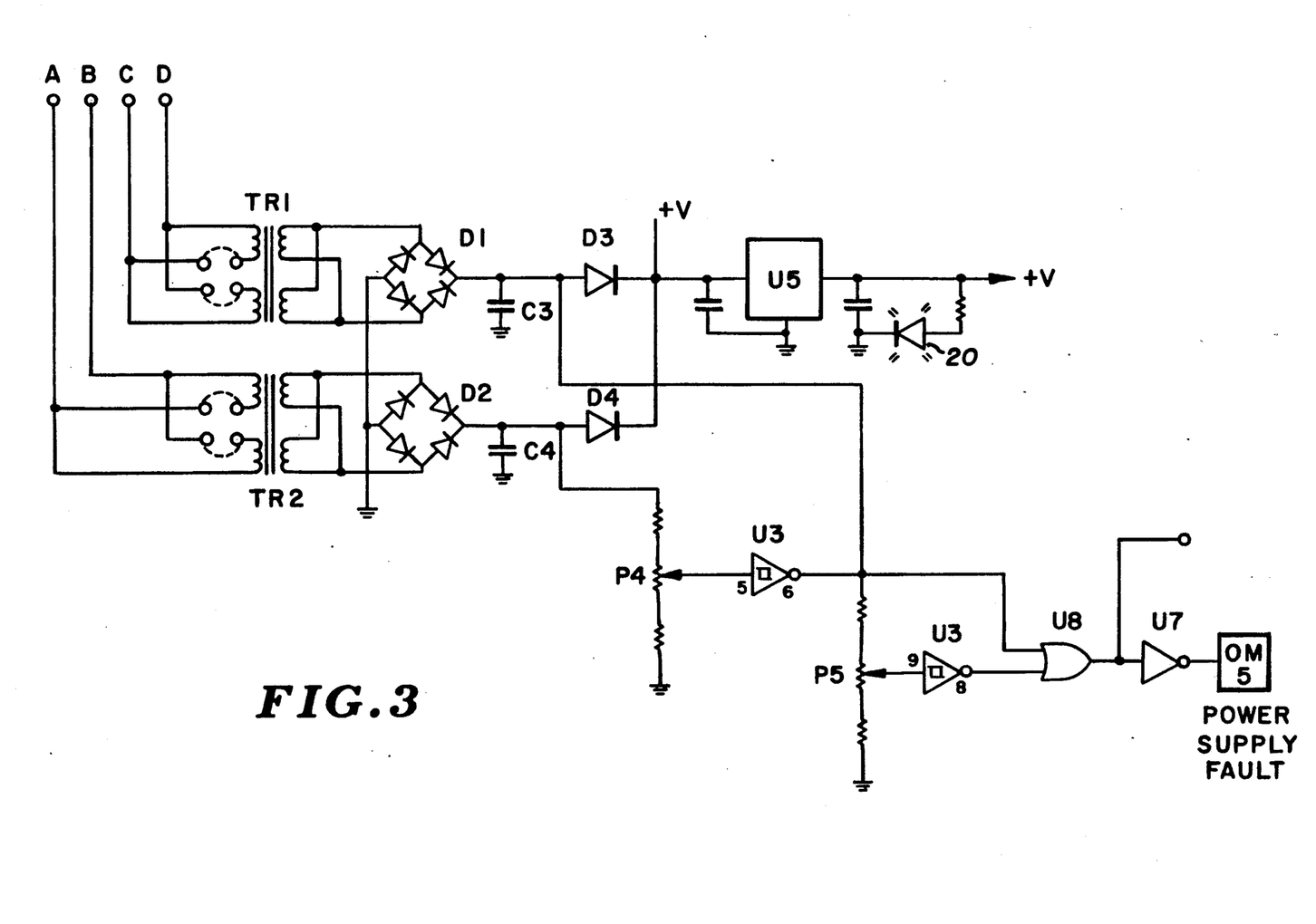
FIG. 3 is a continuation of the circuitry of FIG. 2 particularly illustrating the logic operation and the various controls therefore.

In the schematic illustrations of FIGS. 2 and 3, various components, gates and the like are set forth and described. In FIGS. 2 and 3 and the correlated description, certain pin contacts of the various gates and inverters are provided to present a thorough description of the operation of the unit. In addition to the illustration of FIG. 2, FIG. 3 is provided to illustrate the logic analysis of provisional power to insure the actuation of the various circuit components for switching. Points A, B, C and D illustrate connective points of FIGS. 2 and 3 for continuity of the drawings.

As illustrated, both hot and neutral lines from the preferred power source and the alternate power source are provided with silicon controlled rectifiers (SCR) K1, K2, K3, K4 respectively, with a zero current detector ZCD1, ZCD2 arranged about the high potential lead from each of the sources. Current detectors ZCD1 and ZCD2 are interconnected to sensors S1, S2. It is the zero current detectors that insure that SCRs, K1, K2 are "off" before energization of SCRs, K3, K4 and vice-versa. Peak voltage detectors PVD1 and PVD2 as well as gates U1 and U2 are also interconnected to the preferred power and alternate power lines.

For proper operation of the unit, logic operation must continue even in the absence of power from the preferred voltage source and therefore dual redundant power supplies are utilized and are connected respectively to each of the two sources. This is particularly illustrated in FIG. 3 wherein a first of such redundant supplies is comprised of transformer TR1, bridge circuitry D1, C3 and D3 connected to the preferred source, a second redundant supply, comprised of transformer TR2, bridge circuitry D2, C4 and D4 connected to the alternate source of power. The outputs therefore are diode auctioneered through D3, D4 respectively to provide voltage to voltage regulator U5 as long as either power source is present. Output from U5 actuates LED 20 which indicates to the user that logic power is present. The individual outputs from this dual arrangement are compared to set points P4, P5 and if either falls below the set point, an output is developed through OR gate U8 and inverter U7 to turn on output module 5 (OM5) which turns on OM5 output module LED to indicate a power supply fault.

A best description of the actual circuitry is accomplished through an operational statement.

In the description, the various conditions of load operation from preferred source, load operation from alternate source, subsequent reversal from alternate to preferred source and the sequences of switching to insure that each of the respective power sources is completely off before transferring to the other source will be discussed.

In operation of the unit it is immaterial which source is initially on, but from examination of the Figures, it is obvious that a preferred power source operation is a logical approach for explanation and description.

Instantaneous value of voltage from the preferred source is initially set by P1 which is also supplied to peak voltage detector U1. If the set point is exceeded, the voltage is considered normal for operation. In this condition the output of U1 switches off when the predetermined set point is exceeded. A lower threshhold of voltage is set by selection of resistance R3. This may be, for example, 50% of the rated or normal voltage. When the voltage falls below this lower threshhold level as determined by U1 the output of U1 switches on. This output is integrated by the adjusted RC circuit consisting of rheostat P2 and capacitor C1 which thereafter controls the input of a triggering device U3. This triggering device U3 is commonly referred to as a Schmitt trigger. These components then form a timer which is referred to as a power-fail timer, PFT. If the preferred source voltage exceeds the set point during the next half cycle, U1 switches off and resets the timer so trigger U3 remains off. With no input, the U3 output, being inverted, is high and provides an enabling input to gate U4 at pin 10. Timer U6 (555) is inactive at this time as it only responds to negative-going output from U3 pin 4. With timer U6 off, gate U3 pin 12 is high at gate U4 pin 2 thus enabling the same, since the input to pin 1 is also high.

During this sequence, the alternate SCRs K3, K4 are off since gate U3 pin 4 is low with gate U8 pin 6 and U9 pin 5 also being low. This combination causes gate U7 pin 12 to be high, thus removing control input from the alternate power source SCRs, K3 and K4. As K3 and K4 are off, zero current detector ZCD2, and associated sensor S2 sense no current and S2's output is high. This high output completes the enabling of gate U4 whose output, pin 3, completes the enabling of gate U4 pin 9, and the output of gate U4, pin 8 now high, is inverted through gate U7 with gate U7, pin 14 being low to thus turn on the controlling inputs to the preferred source SCRs, K1 and K2. Assuming that these SCRs are of the zero voltage turn-on category, the junctions turn on at the next voltage zero to complete the delivery of power from the preferred source to the load. Also, at this time the load current is sensed by zero current detector ZCD1 and its sensor S1 whose low output now holds gate U9 at pin 4 off thus holding off control input to alternate power source SCRs, K3, K4.

When gate U3, pin 2, went high it also enabled output module OM3 to indicate through an LED that the power from the preferred was present and further through gate U7, pin 14 output module LED OM1 was enabled and came on to indicate that the preferred voltage was being utilized by the load. At this instance then, there is an indication that the preferred is present and that the load is on the preferred source.

As long as the alternate source voltage is above the predetermined set point of U2, which again is a peak voltage detector, PVD, its output will enable output module OM4, LED to indicate that the alternate source is present. This indication has nothing to do with the transfer of power and is only for the convenience of the user.

When the preferred power source falls below the set point, the output of the peak voltage detector U1 is not reset on that half-cycle and the power-fail timer times out. Input to pin 1 of trigger U3 then goes high and the output from pin 2 of the trigger U3 similarly goes low. This output disables gate U4 at pin 10 and gate U7, pin 14 goes high disabling the control inputs to the SCRs, K1, K2 with the result being that the output module OM1, LED for indicating the load on preferred source goes off. Note that this step is simply a disabling of the SCRs K1, K2 and is not yet a triggering of the SCRs K3, K4 to turn on the alternate power source and connect the load thereto.

At this time, pin 4 of trigger 3 goes high thus enabling gate 9, pin 5 through pin 5 of gate 8. As long as current flows in the preferred circuit the combination of ZCD1, S1 output remains low which provides an inhibiting input at pin 4 of gate U9. With no control input, SCRs K1, K2 turn off on the next current zero as detected by ZCD1 and transmitted by S1. When this occurs gate 9 is enabled and gate 9, pin 6 goes high with gate U7, pin 12 going low. This turns on the control inputs to SCRs K3, K4 thus enabling the alternate power source flow and on the next voltage zero, the SCRs being of the zero voltage type, K3 and K4 turn on to supply the alternate source of voltage to the load and through output module OM2 its LED turns on signifying that the load is now on the alternate source of power.

It should be noted that the turn on of SCRs controlling the alternate power source through K3, K4 does not occur until the zero current detector ACD1 has indicated that no current is flowing through and from the preferred power source. Basically what the applicant's system does through this entire mode of operation is to enable a set of SCRs to turn on with the actual turning on occurring only upon an absolute zero current transfer from the opposite power source, which is now proven off.

Obviously, at some time the preferred source will return to or will be returned to what is considered to be the normal, above set point operational level. When this occurs, peak voltage detector U1 output is reset so trigger U3, pin 1 goes low and pin 2 of U3 goes high, thus providing and enabling input at pin 10 of gate U4. When trigger U3, pin 2, goes high, pin 4 thereof goes low. This action triggers the timer U6 (555) whose on time is set by P6. Timer pin 13 of gate U6 switches high instantly thus holding gate U9 enabled at pin 5 thereof as extended through gate U8, pin 6. Gate U9, pin 4 is also enabled since the preferred current detector ZCD1, S1 combination is still sensing zero current. While U6 is timing, gate U4 is held disabled by the low input at pin 2 thereof so the control inputs for the preferred power source SCRs, K1, K2 remain de-energized.

This delay situation in the transfer back to the preferred source is to insure that the preferred source is stabilized above a set point before the actual transfer occurs. This is a common feature of transfer switches so as to prevent nuisance switching, erratic voltage and the like.

U6 will continue to time out as long as the preferred source is above the predetermined set point. When it times out, the output of U6 again goes low. With both inputs low, gate U8, pin 6 goes low and pin 12 of gate U7 goes high thus removing the control input from alternate SCRs K3, K4. These SCRs turn off on the next voltage zero. When pin 13 of gate U6 returned to low, pin 12 of gate U3 went high. When the ZCD2, S2 combination senses zero current, gate U4 is enabled since pin 2 thereof is already high. Pin 14 of Gate U7 going low energizes the control input of SCRs K1, K2 and on the next voltage zero the load is switched back to the preferred source and the appropriate LEDs come on. These now show that OM1, LED "load on preferred" and OM3, LED "preferred present" are actuated.

Note that the two transfer situations are described with zero voltage turn on (ZVT)SCRs. Devices are also available in a random turn on version. Such a random version turns on instantly when the control input is energized and thus reduces the actual time the load is without voltage. Applicant's mechanism and the principles thereof are applicable to either of the types described and the mode of operation of the SCRs is not a pertinent aspect of the invention.

Note that the alternate power source is also connected to a peak voltage detector U2 with a set level as determined by P3. The output from this peak voltage detector U2 is transmitted through trigger U3, pin 13 through U7, pin 11 to the output module OM4, LED, indicating the presence of the alternate power source. In this manner, the attendant will know through the proper output modules whether the load is on the preferred source or on the alternate source, will also know whether the preferred or alternate is present for switching and will also know whether there is a fault in either of the logic supplies.

Figure 5:
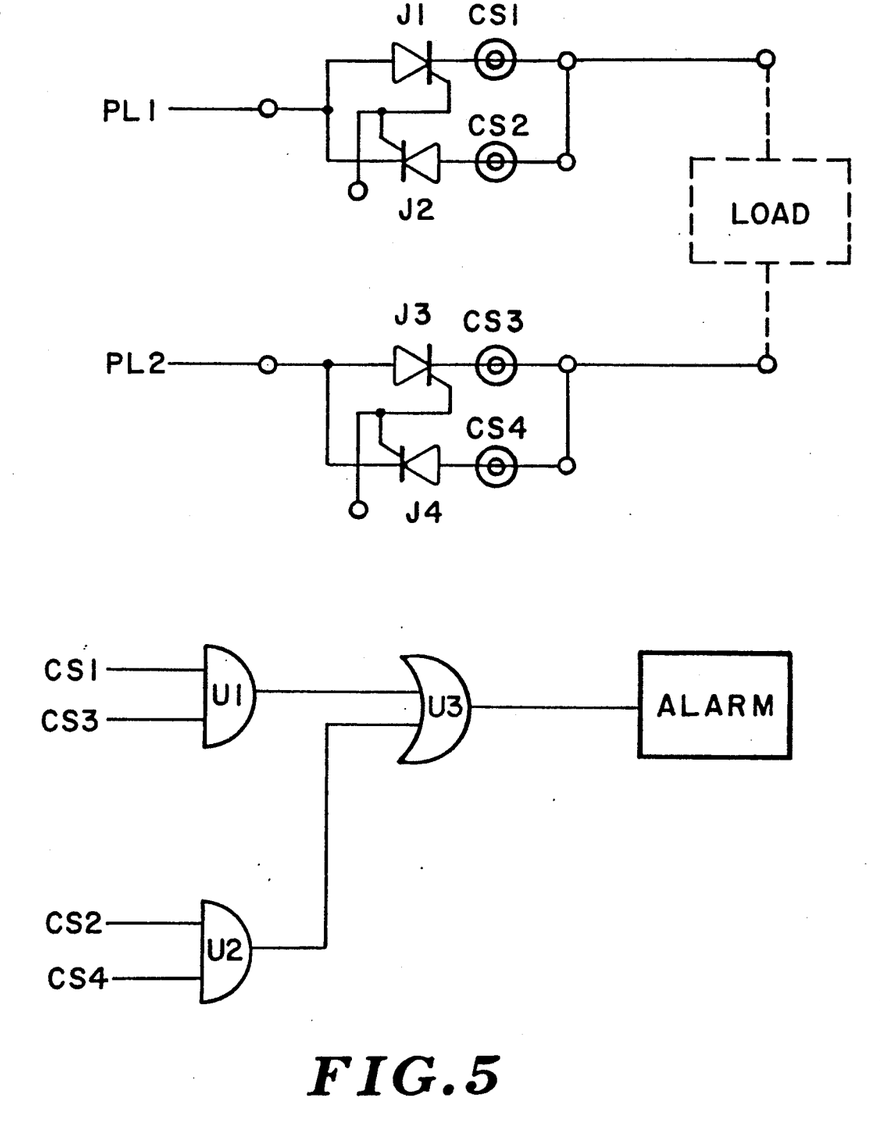

An additional feature of the applicant's concept related to user convenience and monitoring of the transfer mechanism is illustrated in FIG. 5. This illustration relates to the unique method of generating a signal with accompanying alerting mechanisms should any of the solid state switch junctions become shorted.

FIG. 5 illustrates the solid state switches employed in transferring the preferred sources as PL1, P12. Assuming these switches to be of the zero voltage turn on type with control input energized, the following occurs:

1. Upon PL1 going positive, junctions J1 and J4 are forward biased and conduct;
2. Upon PL2 going positive, junctions J2 and J3 are forward biased and conduct;
3. With J1 and J4 conducting, J2 and J3 are blocking and similarly with J2 and J3 conducting J1 and J3 are blocking.

Therefore, in normal operation J1 and J2 never conduct simultaneously and J3 and J4 never conduct simultaneously. In a correctly designed system, the only way both junctions in a pair could conduct simultaneously would be if one shorted.

The condition of one junction shorted can now be evaluated in terms of the overall operation of the transfer mechanism described.

Assuming normal operation of the preferred power source to be present and above the power fail threshold the preferred junctions are switched on with the alternate power source present but its junctions switched off. Should one of the preferred junctions short no effect of normal operation would occur and as the alternate switches are off, the preferred source would continue to supply the load.

If the preferred source falls to zero the load current is forced to zero and transfer to the alternate source occurs when the current sensor detects no current.

If the preferred source falls below the power failure threshold but not to zero, one of several possibilities take place.

If only one junction is shorted the other junctions switching off will force the load current to zero and transfer will take place. If the voltages are out of phase, a partial interconnection will take place between the two phases which is an undesirable condition. Whether the resulting circulating current would cause damage would depend upon the loop imedence and could not be accurately predicted. This same would apply if two junctions shorted in the same pair.

Should two junctions short in opposite pairs the load current would continue after the control power was removed. This would be detected by the current sensor which would prevent transfer.

From the above it is clear that a shorted junction is not a problem when it occurs, but could become a problem later. Therefore it is desirable to call this condition to the attention of an operator so that the entire transfer mechanism could be bypassed and the solid state switch replaced. A scheme for doing this is included in FIG. 5 and is based on a switch being made up on separate inverse parallel SCRs whose connections are accessible. As illustrated, current sensors CS1-4 are in series with the associated junctions. These sensors are the same as used for the current detection and previously labeled ZCDs. In normal operation when PL1 goes positive J1 and J4 conduct. CS1 and CS4 sense current but since J2 and J4 are off, CS2 and CS3 have no output and gates U1 and U2 are not enabled. Similarly U1 and U2 remain off when J2 and J3 conduct. Assume junction J2 shorts when PL1 goes positive. Now junctions J2 and J4 conduct and current is sensed by CS2 and CS4. This results in both inputs to gate U2 going high enabling U2 whose output into gate U3 energizes an alarm. Similarly, if J3 had shorted, gate U1 would have been enabled and the alarm energized.

In conclusion, therefore, if any junction conducts when it should be blocking, an alarm will be generated. The user, alerted by the alarm, will bypass the transfer mechanism and replace the shorted junction prior to the shorted junction affecting the entire unit's operation.

It should be obvious with the applicant's invention that a unique mechanism to provide rapid transfer only after guarantee of no current flow is provided by a two step interlock. First, an enabling function occurs to ready the switches, and thereafter the switches are switched by detection of zero current flow in the circuit which is the AC supply circuit which is at fault, with flow beginning at the next zero voltage level.

Applicant's description and disclosure obviously provides for an operational as well as a descriptive statement of elements necessary to provide a completely operative connect and interconnect for delivering power to a load from a preferred or alternate power source.

What is claimed is:

1. A solid state, static, power transfer mechanism for automatically transferring a load from a first, preferred, AC power source to a second, alternate AC power source while insuring the integrity and operative continuity of such transfer of power to the load, including:
   a. a first hot and a first neutral power transmitting conductor betwen the first power source and the load;
   b. a first pair of solid state switches respectively arranged on each of said first conductors controlling power therethrough;
   c. a second hot and a second neutral power transmitting conductor between the second power source and the load;
   d. a second pair of solid state switches respectively arranged on each of said second conductors controlling power therethrough;
   e. peak voltage detection means arranged to monitor power transmitted from the first power source and deliver a signal therefrom when the voltage from said source exceeds a predetermined level;

f. time delay means responsive to said signal from said peak voltage detection means and providing a signal at the end of the time delay period;

g. a first and a second gate;

h. said gates being responsively connected to receive said signal from said time delay, said signal enabling said first gate and disabling said second gate;

i. the output of said first gate being connected respectively to each of said first pair of solid state switches controlling power through said first hot and neutral conductors and the output of said second gate being connected respectively to each of said second pair of solid state switches controlling power through said second hot and neutral conductors whereby said first solid state switches are energized to allow power transfer from said first source to the load and said second solid state switches are disabled to prevent transfer from said second source to the load and, j. said peak voltage detection means includes means for adjusting the same to provide a normal operating power level above which the signal thereof is delivered to said time delay.

2. The power transfer mechanism as set forth in claim 1 and said peak voltage detection means includes means for adjusting the same to provide a lower threshold operating level.

3. The power transfer mechanism as set forth in claim 2 where said means for adjusting said lower threshold operating level of said peak voltage detection means includes an adjustable RC circuit and a trigger to provide a power fail timer.

4. The power transfer mechanism as set forth in claim 3 wherein the signal from said peak voltage detection means switches off to reset said timer should the voltage from said first source be above the normal operating power level during the next half cycle of power transmission.

5. The power transfer mechanism as set forth in claim 1 and monitoring and indicating means associated with each of said solid state switches for monitoring internal shorting thereof and indicating a shorted condition thereof.

6. The transfer mechanism as set forth in claim 1; and, a. a first zero current detector arranged to sense current conduction through said first hot conductor;

b. a first sensor communicating with said first zero current detector and transmitting a signal therefrom responsive to the transmitting condition of said first hot conductor as sensed by said first zero current detector;

c. a second zero current detector arranged to sense current conduction through said second hot conductor; and, d. a second sensor communicating with said second zero current detector and transmitting a signal therefrom responsive to the transmitting condition of said second hot conductor as sensed by said second current detector.

7. The power transfer mechanism as set forth in claim 6 and said first sensor transmitting a signal to said second gate to maintain said second solid state switches disabled when power is transmitted through said first hot conductor.

8. The power transfer mechanism as set forth in claim 7 and monitoring and indicating means associated with each of said solid state switches for monitoring internal shorting thereof and indicating a shorted condition thereof.

9. The power transfer mechanism as set forth in claim 6 and said second sensor transmitting said signal to said first gate to maintain said first solid state switches enabled when no power is transmitted through said second hot conductor.

10. The power transfer mechanism as set forth in claim 7 and monitoring and indicating means associated with each of said solid state switches for monitoring internal shorting thereof and indicating a shorted condition thereof.

11. The power transfer mechanism as set forth in claim 11 and said first sensor transmitting a signal to said second gate to enable said second solid state switches when no power is transmitted through said first hot conductor thereby allowing transmission of power from the alternate power source and through said second hot conductor.

12. The power transfer mechanism as set forth in claim 11 and said second sensor transmitting a signal to said first gate to disable said first solid state switches when power is transmitted through said second hot conductor from the alternate source of power thereby preventing transmission of power from the preferred power source and through said first hot conductor.

13. The power transfer mechanism as set forth in claim 1 and monitoring and indicating means associated with each of said preferred and alternate power sources and said first and second conductors for determining the respective availability of the same for transmission and the respective transmission states thereof.

* * * * *